United States Patent
Kelch

(10) Patent No.: US 6,755,228 B2
(45) Date of Patent: Jun. 29, 2004

(54) METHOD AND APPARATUS FOR THE THERMAL CLAMPING AND RELEASING OF TOOLS

(75) Inventor: Matthias Kelch, Schorndorf (DE)

(73) Assignee: Kelch GmbH & Co. Werkzeugmaschinenfabrik, Schorndorf (DE)

( * ) Notice: Subject to any disclaimer, the term of this patent is extended or adjusted under 35 U.S.C. 154(b) by 124 days.

(21) Appl. No.: 09/862,122

(22) Filed: May 21, 2001

(65) Prior Publication Data

US 2001/0054471 A1 Dec. 27, 2001

(30) Foreign Application Priority Data

| May 22, 2000 | (DE) | 100 25 007 |
| May 22, 2000 | (DE) | 100 25 008 |
| May 22, 2000 | (DE) | 100 25 004 |

(51) Int. Cl.[7] ............................................. B23P 11/02
(52) U.S. Cl. .................... 156/499; 156/84; 156/85; 29/447; 269/289 R
(58) Field of Search ..................... 269/289 R, 290–294; 156/84–86, 378, 499; 29/447, 559; B23P 11/02

(56) References Cited

U.S. PATENT DOCUMENTS 5,127,780 A * 7/1992 Massa ........................ 409/234
6,216,335 B1 * 4/2001 Freyermuth .................. 29/701
2001/0024020 A1 9/2001 Rabe

FOREIGN PATENT DOCUMENTS

| DE | 39 25 641 | 8/1990 | | |
| DE | 297 05 185 | 6/1997 | | |
| DE | 298 20 838 | 4/1999 | | |
| DE | 200 08 937 | 8/2000 | | |
| DE | 199 15 412 | 10/2000 | | |
| DE | WO 01/89758 | * 11/2001 | ........... B23P 11/02 |
| EP | 1 138 422 A2 | 9/2001 | | |
| JP | 1-153225 | * 6/1989 | ........... B23P 11/02 |

* cited by examiner

Primary Examiner—Jeff H. Aftergut
Assistant Examiner—Jessica L. Rossi
(74) Attorney, Agent, or Firm—Knechtel, Demeur & Samlan

(57) ABSTRACT

A shrinking device (1) for the thermal clamping and release of tools in shrink chucks has a preferably inductively operating heating device (17) for heating tool reception sections of shrink chucks and a cooling device for the active cooling of the heated shrink chucks. The device has several, particularly three work stations (5, 6, 7) and in each work station it is possible both to heat a shrink chuck and also actively cool the shrink chuck received. By pivoting a column (16) carrying the heating device it is possible to interchange between the workstations. The shrinking apparatus makes it possible on a continuous basis to shrink large numbers of tools.

32 Claims, 3 Drawing Sheets

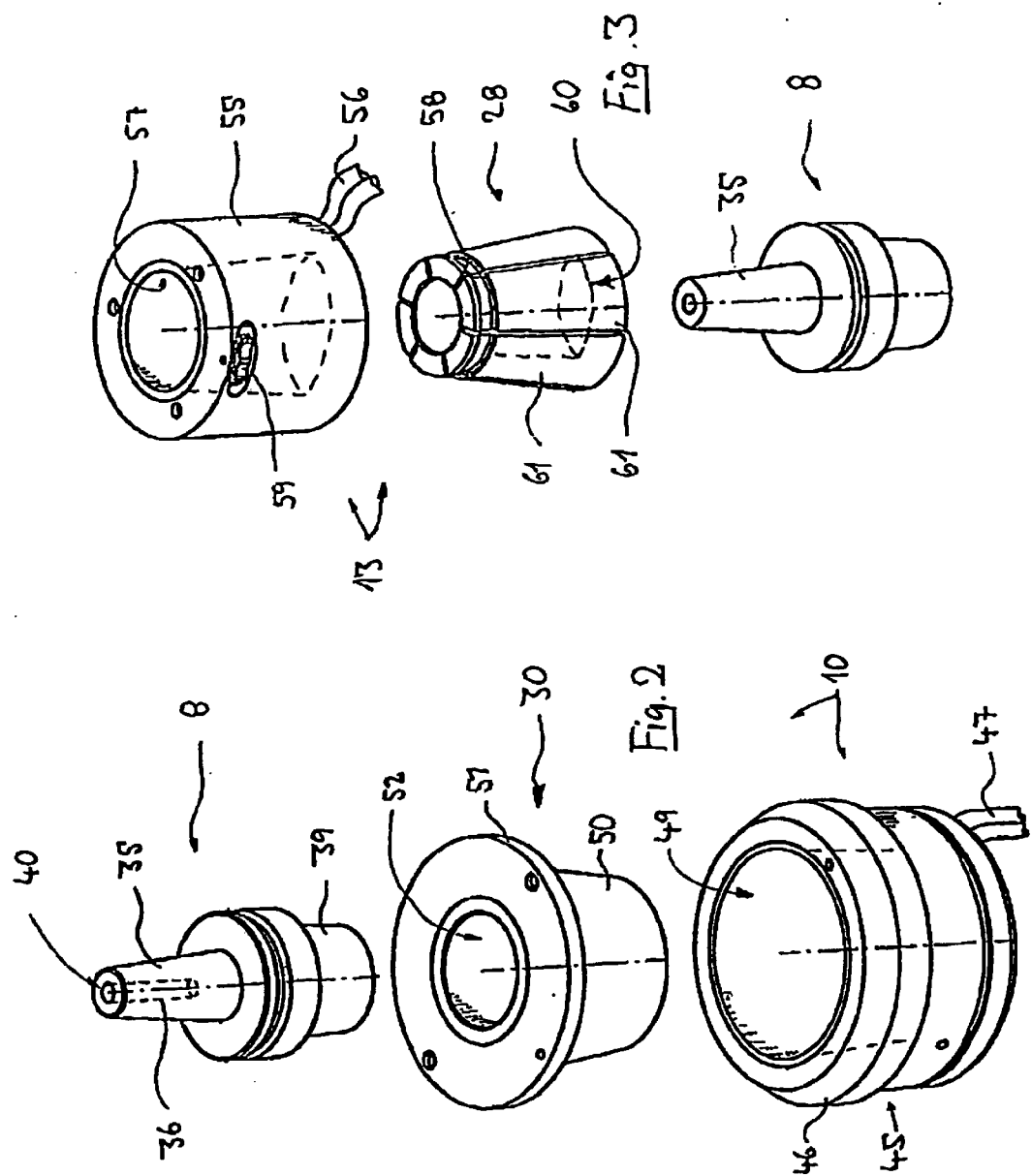

METHOD AND APPARATUS FOR THE THERMAL CLAMPING AND RELEASING OF TOOLS

BACKGROUND OF THE INVENTION

1. Field of the Invention

The invention relates to a method and an apparatus for the thermal clamping and releasing of tools in shrink chucks.

2. Description of the Prior Art

Shrinkage is a known method for the manufacture of high-speed tools for material-removing workpiece machining. Use is made of so-called shrink chucks, which have a tool reception section with an at least zonally thermally widenable tool reception opening for receiving a tool shank, as well as a clamping section provided in a machine spindle for receiving the clamp chuck and which can e.g. be constructed in the manner of a steep taper or a hollow shank taper. Typical diameters of the tools to be shrunk in, e.g. in the form of drilling, milling or grinding tools can be approximately 3 to 6 mm to approximately 30 to 40 mm. For the manufacture of a tool at least one portion of the tool reception section is heated to such an extent that as a result of thermal expansion the tool reception opening is so widened that the tool shank of a tool to be inserted can be introduced. Following the insertion of the tool shank the portion is cooled in such a way that the tool is held by frictional resistance in the tool reception opening shrunk as a result of cooling. Thus, tools are obtained as if in one piece and the connection between the shrink chuck and inserted tool can be released again at any time by shrinking out in that the tool reception section is heated to such an extent that the inserted tool is removable again from the thermally widened tool reception opening. In the present application generally both the tool part to be inserted, e.g. a milling cutter, and the combination resulting from the assembly of the tool part and the shrink chuck is referred to as a tool.

Shrinkage devices are known in which the heating of the tool reception section is performed during shrinking in and out by means of hot air. By means of a separate cooling device equipped with a fan the cooling time can be reduced to approximately 10 minutes to give a temperature suitable for the manual handling of the shrink chuck. Such devices are inexpensive to provide and are particularly suitable for applications where only small numbers of shrink chucks per time unit have to be handled.

During shrinking in and in particular shrinking out of carbide tools by means of hot air devices, as a result of the different thermal expansion coefficients of the tool material and the shrink chuck material problems do not generally arise, but in the case of tools with HSS and steel shanks, particularly when shrinking out problems can occur, because in this case the thermal expansion behavior of the tool material and the chuck material is similar and with slow heating the tool shank can be enlarged to such an extent in the widening tool reception opening that the tool continues to be held by the widening reception opening and cannot be removed or can only be removed by exerting force.

To avoid these problems it has already been proposed to inductively heat the shrink chucks during thermal clamping and releasing. Energy introduction by means of an induction coil surrounding the shrink chuck can take place so rapidly that a temperature rise of shrunk in tools only occurs to a limited extent by heat conduction. Besides permitting the shrinking out of carbide tools, it reliably permits the shrinking out of tools having essentially the same temperature expansion behavior as the material of the typically steel shrink chuck.

A known, inductive shrinkage device is designed as a table-mounted device and has a box-like casing which can be installed on a table and whose top forms the working surface of the device. Above the working surface is raised a column with vertical guides for a coil holder, to which can be fitted an induction coil above the workstation of the device. An integrated pneumatic cylinder moves the column-guided, air-cooled coil into the working position downwards or back into the upper neutral position. The main clamping range of interest with a 6 to 32 mm tool diameter is covered by three different coils, which can be changeably fitted to the coil holder by means of a snap closure. The working surface of the device formed by the top of the casing is designed as a perforated plate through which an air flow produced by a fan located in the casing can be blown from below through the working surface. Besides the work station located below the coil, the work surface carries several circular cooling stations through which air can be blown from below.

For shrinkage purposes a shrink chuck is engaged in a transportable chuck reception sleeve, which is provided with radial cooling ribs and through which air flows from below on installation in the workstation. Then the previously appropriately selected induction coil for heating the shrink chuck is lowered onto the latter and inductive heating is carried out for shrinking in or out. After inserting or removing the tool the coil is raised again. Then the chuck reception sleeve carrying the still hot shrink chuck is placed on one of the cooling stations. To speed up cooling a separate cooling sleeve with cooling ribs surrounding the tool reception section can be installed. The workstation which has been freed below the induction coil can be used for shrinking the next chuck.

The resulting handling of the device has proved to be problematical. It has also been found that the device is only suitable to a limited extent for a rapid passage of higher numbers, because there is a slow overall system heating. Operators have also considered it to be disadvantageous that in part still hot chucks have to be moved in order to achieve a higher throughput.

SUMMARY OF THE INVENTION

The object of the invention is to provide a method and apparatus for the thermal clamping and releasing of tools in shrink chucks, which permit a relaxed, low-fatigue working during shrinking, particularly during the continuous processing of large numbers.

To solve this problem the invention proposes a method for the thermal clamping and release of tools in shrink chucks, a shrink chuck having a tool reception section with an at least zonally thermally widenable tool reception opening for receiving a tool shank and a clamping section for receiving the shrink chuck in a machine spindle, the method comprising a heating of at least part of the tool reception section for widening the tool reception opening and a subsequent active cooling of the tool reception section, the method comprising the following steps:

heating the tool reception section of a first shrink chuck received in a first work station of a shrinking device;

at least one of introducing a tool shank into the tool reception opening of the first shrink chuck and removing a tool from the tool reception opening of the first shrink chuck;

active cooling of the tool reception section of the first shrink chuck received in the first work station;

heating the tool reception section of a second shrink chuck received in a second work station of the shrinking device, the second work station being separate from the first work station of the shrinking device. Further the invention proposes an apparatus for the thermal clamping and release of tools in shrink chucks, a shrink chuck comprising a tool reception section with at least one zonally thermally widenable tool reception opening for receiving a tool shank and a clamping section for receiving the shrink chuck in a machine spindle, the apparatus comprising at least one heating device for heating at least part of the tool reception section and a cooling device for the active cooling of a heated part of the tool reception section, the apparatus comprising a first work station and at least one second work station, wherein a work station is provided for the heating and the active cooling of shrink chucks received in the work station and wherein the work stations and the heating device are movable relative to one another for changing between work stations.

In the case of the thermal clamping or release of tools in shrink chucks according to the invention, there is initially a heating of the tool reception section of a first shrink chuck received in a first work station of a shrinkage device. Then, during the shrinking in of the tool shank of a tool to be shrunk in is introduced into the tool reception opening or during shrinking out a shrunk in tool is removed. In the case of a widened tool reception opening a partial tool change is possible, i.e. the removal of one tool part and directly following the same the introduction of another tool part. There is then an active cooling of the heated tool reception section of the first shrink chuck in the first work station. There is also a heating of the tool reception section of a second shrink tool, which is received in a second work station separate from the first work station.

Thus, there are several, i.e. at least two work stations, at which can be performed both a heating of the tool reception section and also an active cooling thereof and cooling appropriately lasts until the tool reception section has a safe temperature suitable for the manual handling of the shrink chuck, which is e.g. less than 40 or 30 degrees C. The provision of several, e.g. two, three or four work stations makes it possible, compared with known solutions, to achieve significantly improved tool logistics and an improved handling, which is much more agreeable for an operator, because in the case of the sought, high tool throughput it is no longer necessary to remove from a work station a still hot and consequently difficult to manually handle tool.

The method according to the invention also permits a substantially parallel or only slightly deferred working with several shrink chucks, because the heating of the shrink chuck received in the second work station can take place at least partly during the cooling of the first shrink chuck received in the first station, so that high throughput capacities are possible. Several shrinkage cycles (heating, introduction and/or removal of a tool, cooling to handling temperature) can be performed substantially in parallel or only slightly deferred and in time-overlapping manner.

In view of the fact that generally the duration of a shrinkage cycle is determined by the cooling time, in preferred variants a particularly advantageous cooling device for the shrink chucks is provided.

The cooling device is characterized in that it is constructed for cooling the cooling adaptor with a cooling fluid or liquid. Cooling can also be accelerated with the aid of liquid cooling, which can particularly effectively dissipate heat from the tool reception section. Active heat dissipation is particularly advantageous, because generally the duration of a shrinkage cycle is essentially determined by the cooling time. Thus, if the cooling time is reduced, the shrinkage cycles are shortened, so that it is possible to process larger numbers of shrink chucks per time unit. A cooling adaptor through which can flow a cooling liquid can, following the end of heating, be inverted onto the tool reception section with large-area contact or fitted in some other way thereto and rapidly removes heat, e.g. within approximately one minute from the heated tool reception section, so that subsequently it is easily possible to manually handle the said shrink chuck without any burning risk.

For creating a large-area contact it is preferably ensured that the cooling adaptor has a preferably conical reception opening, which is so adapted to the preferably conical outer contour of the tool reception section that there is a good heat conducting press fit between the tool reception section and the cooling adaptor. Corresponding to the shaping of the mainly used shrink chucks, the reception opening has an acute opening angle between approximately 3 and approximately 6°, being in particular approximately 4.5°.

Since particularly with acute cone angles, a cooling adaptor mounted in accurately fitting manner may be difficult to remove again from the shrink chuck due to self-retention, in a preferred embodiment the reception opening is widenable for loosening contact between the shrink chuck and cooling adaptor. The reception opening can be e.g. bounded by several springy elements or spring tongues distributed around the circumference of the reception opening.

In order to be able to equally effectively cool all commercially available shrink chucks with the cooling device, preferably with a cooling adaptor, are associated several replaceable change inserts with differently dimensioned reception openings. The change inserts are preferably replaceably fixed without the aid of tools to a coolable part, e.g. a liquid-carrying sleeve. A change insert can be constructed in the manner of a split-clamping sleeve. Thus, an insert with a widenable reception opening can be created, which compared with the coolable cooling adaptor body surrounding it is movable to a limited extent between a contact position and a release position and in the contact position the insert is pressed by the sleeve surrounding it into a real contact with the shrink chuck and in the release position the shrink chuck can easily be released from the cooling adaptor accompanied by the widening of the reception opening. This on the one hand permits a good heat transfer between cooling adaptor and shrink chuck and on the other at all times permits trouble free handling.

Appropriately a cooling adaptor is connected to at least one flexible line, e.g. to a pair of heat-resistant, metal-enveloped hoses, which ensures the supply and removal of cooling liquid and simultaneously makes it possible to substantially freely manually move and therefore easily handle the cooling adaptor.

In a preferred embodiment a particularly effective cooling of shrink chucks is achieved in that the cooling device also has at least one liquid-coolable shrink chuck receptacle with a shrink chuck reception opening for the positionally secured reception of the chuck. This makes it possible to ensure that the clamping section of a received shrink chuck is effectively actively cooled, so that during cooling it can serve as a heat sink in addition to a fitted cooling adaptor. This also ensures that the heat introduced on heating is not spread through the receptacle to the entire shrinkage device, which could lead to a slow heating of the overall system and to operating problems.

Appropriately with a shrink chuck receptacle are associated several replaceable change inserts with differently dimensioned reception openings for adapting the shrink chuck receptacle to shrink chucks with different clamping sections, e.g. hollow shank tapers or steep tapers, so that effective cooling can take place of any conventional shrink chuck.

The cooling device can e.g. be operated with water from domestic mains. For protecting resources it can have a closed coolant circuit. Optionally it is possible to provide a cooling unit connected in as desired so that in particular during permanent operation the cooling liquid is kept at a temperature suitable for effective cooling of typically 15 to 20° C.

As illustrated by means of the embodiment, the cooling device can be integrated into a shrinkage device. However, it is also possible to construct the cooling device as a separate entity. Such a preferably transportable cooling device can be used in conjunction with most conventional shrinkage devices, so that on shrinking with the latter the cooling times can be significantly reduced so as to achieve a higher throughput. The features of the cooling device can be useful in all shrinkage devices independently of the nature of the heating device and the number of workstations in a shrinkage device.

Although any type of shrink chuck heating is possible, e.g. hot air, in preferred embodiments inductive heating is provided, which permits a particularly rapid heating of the tool reception section from the outside and consequently particularly facilitates the shrinking out of tools, whose thermal expansion behavior substantially corresponds to that of the shrink chuck. Although several induction coils can be provided, there is preferably only one induction coil for serving all the workstations and for changing between individual workstations the induction coil and workstations can be moved relative to one another. In a preferred embodiment three work stations are arranged in fixed manner on an arc and the induction coil is PivotTable mounted about a vertical pivoting axis in the center of the arc, so that in each case by rotation it can be placed above a work station and for performing the shrinkage process can be lowered vertically onto a shrink chuck in a working position or at the end thereof can be retracted upwards into a normal position.

In certain embodiments the induction device for heating shrink chucks only has one induction coil and is constructed in such a way that with said induction coil it is possible to shrink tools with a wide diameter range from at least 6 to 25 mm. Thus, when changing between different diameter tools, there is no need to replace the coil of the shrinking device. The shrinking device is consequently universally usable and is easy to operate. As no working time has to be wasted for changing coils, apparatuses according to the invention permit higher throughput capacities of shrink chucks to be processed. It is optionally possible to deal with smaller and larger diameters, e.g. up to approximately 32 mm.

As working can take place with a fixed installed induction coil, without any sealing problems it is possible to achieve a particularly effective cooling with cooling liquid of the induction coil, which is particularly advantageous for continuous operation. The induction coil can e.g. be formed by a copper tube or the like through which there is a flow.

For speeding up the individual shrinkage cycles and for ensuring that for each type of shrink chuck (large or small clamping diameter) it is possible to inductively transfer a power or capacity suitable for heating, in preferred embodiments by means of an automatic chuck identification device the type of shrink chuck to be heated is automatically identified and the power of the induction coil is adapted or controlled as a function of said type. For this purpose appropriately the operating voltage applied to the induction coil is progressively increased from the lowest preset voltage until it can be established by means of the current drawn from the generator that an adequate heating power is being provided.

For optimizing inductive heat introduction by means of a preferably mechanical, automatic positioning device there can be an automatic axial positioning of the induction coil on lowering onto the particular shrink chuck. Appropriately by means of an adjustable stop it is ensured that the lowering induction coil stops at a height level in which the electromagnetic alternating field produced by the induction coil is coupled in optimum manner into the section of the tool reception opening or shrink chuck used for tool clamping.

This permits a substantially automated sequence of a shrinkage process, in that by means of a control panel certain of the shrinkage-characterizing parameters are inputted, e.g. the diameter or diameter range and material of the tool to be shrunk in. A microprocessor-controlled cycle can then comprise a motor lowering of the induction coil from a neutral position towards the shrink chuck, a subsequent automatic positioning for fixing the correct axial position relative to the shrink chuck, an automatic identification of the shrink chuck type by means of the power drawn from said chuck, an automatic heating of the shrink chuck performed by means of correspondingly preprogrammed values for the heating time and power and optionally after introducing and/or removing a tool an automatic raising of the induction coil back into the neutral position. During this automatic sequence an operator can prepare the next workstation for a shrinkage process. This advantageous variant of an induction device can also be used with shrinkage devices with only a single workstation or with two or three workstations.

These and further features can be gathered from the claims, description and drawings and the individual features, either singly or in the form of subcombinations, can be implemented in an embodiment of the invention and in other fields and can represent advantageous constructions.

BRIEF DESCRIPTION OF THE DRAWINGS

An embodiment of the invention is described hereinafter relative to the attached drawings, wherein show:

FIG. 2 A perspective view of parts of a water-coolable shrink chuck receptacle for an work station of the apparatus shown in FIG. 1 together with a shrink chuck receivable therein.

FIG. 3 A perspective view of parts of a water-cooled cooling adaptor associated with a work station, together with a shrink chuck coolable by the cooling adaptor.

DESCRIPTION OF PREFERRED EMBODIMENTS

Figure 1:
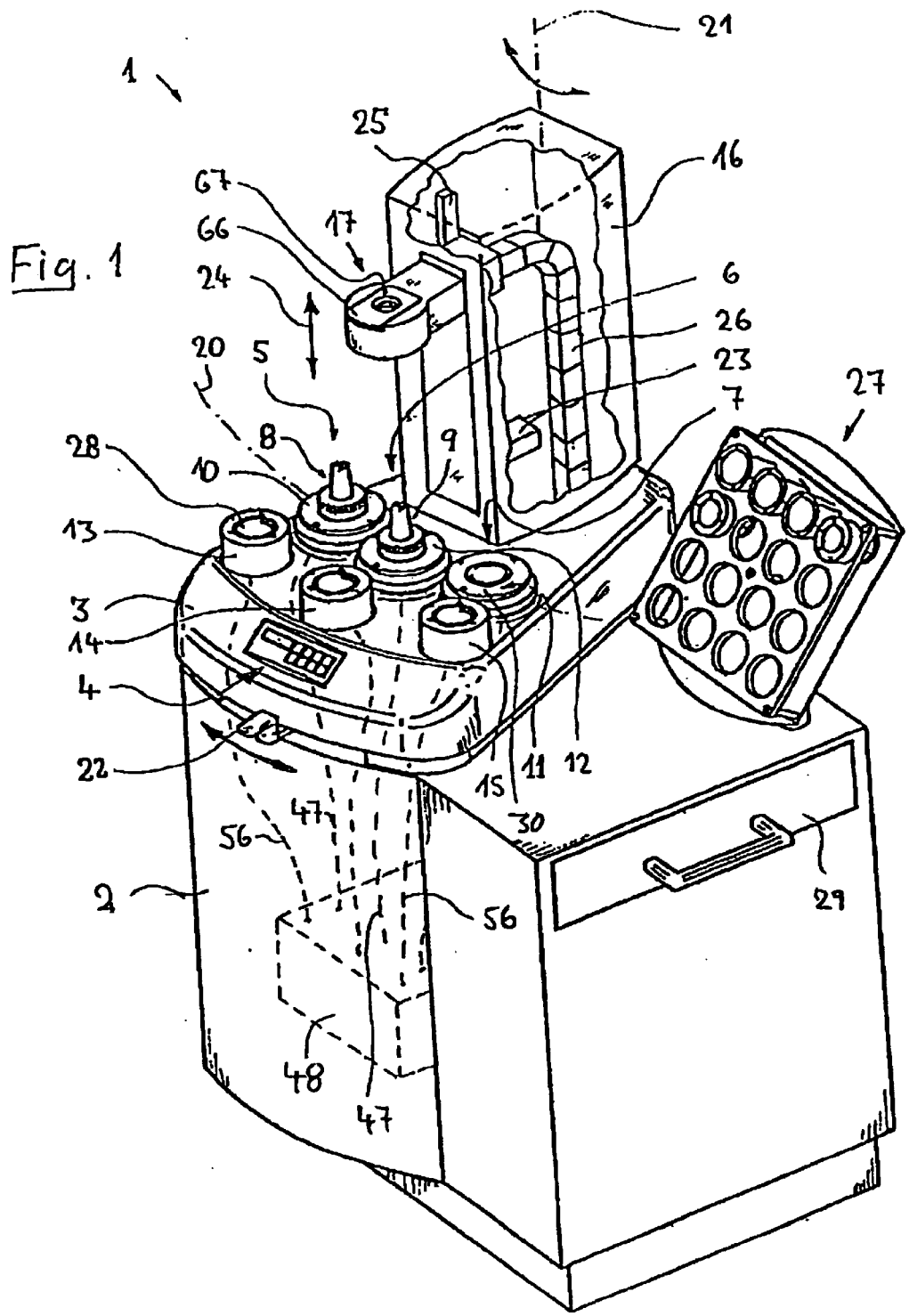
FIG. 1 An inclined perspective, diagrammatic view of an embodiment of an inductive shrinking apparatus with three workstations.

FIG. 1 is an inclined perspective, diagrammatic view of an apparatus 1, also referred to as shrinking apparatus or device for the thermal clamping and releasing or unclamping of tools with respect to shrink chucks, which makes it possible in continuous operation to clamp or release a large number of high speed machining tools in short sequence by means of shrinkage technology, in order to e.g. obtain a highly efficient work place with a high tool throughput. The embodiment shown comprises a closed lower cabinet 2, in which are housed subsequently described supply units for the shrinking device, such as a high frequency generator for supplying an induction coil, a cooling unit of a water cooling device and an electronic control for the shrinking device equipped with a microprocessor. On the roughly hip-high top of the lower cabinet is fixed a substantially tart piece-shaped closed base part 3 with a casing in the form of an aluminum casting. On its sloping front the base part has a control panel 4 with a number of push buttons and an optical display for adjusting and displaying the operating parameters predetermined for operating the shrinking device. On the top of the base part are provided three arc-juxtaposed work stations 5, 6, 7, which are in each case designed both for inductive heating of shrink chucks 8, 9 received therein and for active cooling of the heated shrink chucks with the aid of a water cooling system. For this purpose each of the workstations has a liquid-coolable shrink chuck receptacle 10, 11, 12, whose construction will be further described in conjunction with FIG. 2. With each work station is also associated a manually easily handlable cooling adaptor 13, 14, 15 mountable from above on a shrink chuck and the cooling adaptors belonging to the individual work stations are placed from an operator position in front of the associated work station in a circular reception opening on the base part top. The construction and operation of the cooling adaptors will be described in conjunction with FIG. 3.

From the operator position behind the work stations, above the base part rises an all-round lined column 16 from whose operator-facing front projects horizontally an induction coil unit 17 with a water-cooled induction coil 18 (FIGS. 4, 5) in such a way that the vertical central axis 19 of the coil coincides with the arc 20 linking the vertical central axes of the work stations 5, 6, 7. The column 16 is PivotTable mounted about a vertical column pivoting axis 21 and can be so pivoted with the aid of a control lever 22 projecting from the front of the base part that the induction coil 18 can, as desired, be positioned directly above or concentrically with one of the work stations and with the aid of a locating means the centered position is automatically obtained after releasing the control lever 22.

Figure 4:
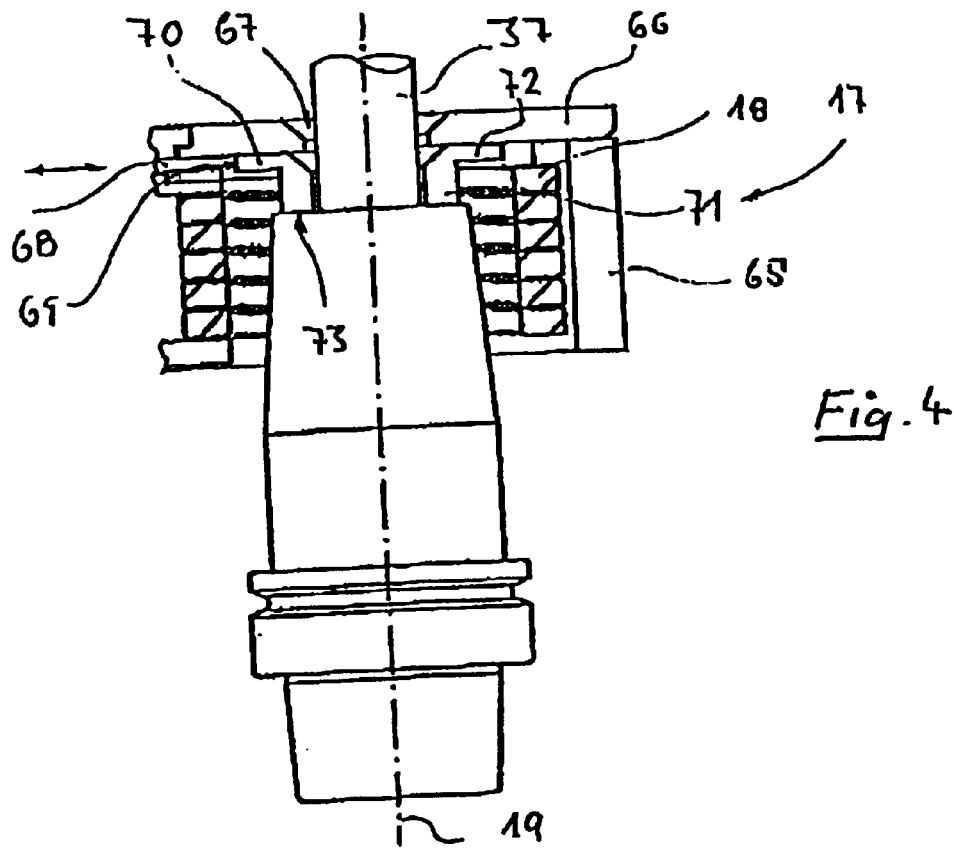
FIG. 4 A vertical section through the induction coil unit of the apparatus of FIG. 1 in a configuration suitable for the heating of shrink chucks for large diameter tools.
Figure 5:
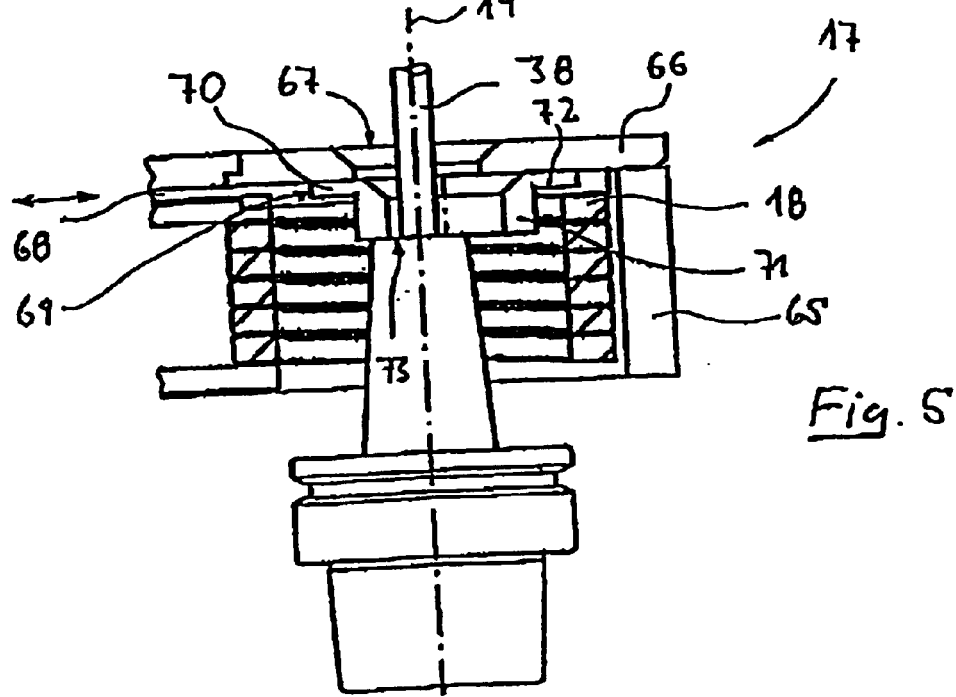
FIG. 5 A vertical section through the induction coil unit of the apparatus of FIG. 1 in a configuration suitable for heating shrink chucks for small diameter tools.

The induction coil unit 17 serving as a heating unit is movable by an electric motor 23 operable for controlling the shrinking device and housed within the column casing between the represented, upper neutral position and a lower work position subsequently described relative to FIGS. 4 and 5 (arrow 24). For this purpose a worm gear (not shown) driven by the electric motor 23 is provided, which acts on the induction coil unit guided on a vertical guide rod 25. The flexible liquid lines for water cooling of the induction coil and the electric lines for connecting the coil to the generator housed in the lower cabinet 2 are protected in a flexible cable tow 26, which leads from the interior of the column, through the base part into the lower cabinet 2.

Besides the base part, on the upper working surface of the lower cabinet and within reach of the operator 2, is provided an inclined magazine 27, pivotable about a vertical axis and having sixteen reception devices for receiving differently dimensioned change inserts 28 for the cooling adaptors, whose construction and function will be described relative to FIG. 3. A lateral drawer 30 can e.g. be used for storing the change inserts 30 described relative to FIG. 2 for the shrink chuck receptacles of the work stations 5, 6, 7 and/or further parts which may be necessary during shrinkage such as tools or the like.

By means of FIG. 2 will now be described a typical construction of a shrink chuck 8 adapted for mounting in the shrinking apparatus 1. A shrink chuck is normally made from a suitable steel material and has an e.g. frustum-shaped tool reception section 35 in which is centrally introduced a tool reception opening or bore 36 for receiving a tool shank of a tool insertable in said opening or bore (e.g. tools 37 or 38 according to FIGS. 4 and 5). The clamping or gripping diameter of the tool reception opening is appropriately designed for a shank tolerance h6 to allow a problem free shrinking in and out of reception shanks, which should also have a tolerance of h6 (center tolerance). The tool reception opening diameter is dimensioned in such a way that in the cold state of the shrink chuck it is slightly smaller than the external diameter of the tool shank to be clamped in, but on heating the tool reception section to temperatures of e.g. 200 to 300° C. is so widened by thermal expansion that it is possible to introduce a cold or cool tool shank. The outer contour of the tool reception section is conical in the portion following on to the front mouth 40 of the tool reception opening with a cone angle of 4.5°. However, the diameter of the frustum-shaped portion can vary as a function of the diameter of the tool to be received. Typical tool shank diameters are approximately 6 mm to approximately 25 to 30 mm.

At the opposite end is provided a clamping section 39 for the reception of the shrink chuck in a machine spindle of a machining tool and which in the present example is constructed as a hollow shank taper, but in other embodiments can be a steep taper or a portion with other, e.g. cylindrical shapes and dimensions.

The shrinking apparatus 1 is designed for a particularly effective cooling of such optionally differently dimensioned shrink chucks. The integrated cooling device functions with liquid coolant, generally water with additives and is consequently used both for cooling the shrink chuck receptacles 10 to 12 and the cooling adaptors 13 to 15 and also the induction coil 18, in that said parts can be connected to an optionally closed coolant circuit. A liquid-cooled shrink chuck reception device (FIG. 2) comprises a sleeve-like cooling outer part 45 equipped with all-round coolants ducts and which can be so inserted in a circular reception opening of the base part 3 that a circumferential collar 46 is mounted on the base part top. The coolant ducts circulating in the sleeve wall are connected by means of coolant lines 47 indicated in broken line form in FIG. 1 and e.g. in the form of flexible hoses, to a water supply 48 diagrammatically indicated in FIG. 1. The cooling outer part 45 made from good heat conducting metal, e.g. aluminum, is provided on its top with a downwardly funnel-shaped tapering, frustum-shaped reception opening 49, in which can be inserted in accurately fitting manner replaceable, aluminum change inserts 30.

A change insert 30 has a frustum-shaped insertion section 50, which can be introduced under surface adaptation into the reception opening 49, as well as an outwardly projecting collar section 51, which with the change insert inserted rests on the top of the cooling outer part 45 and can optionally be fixed thereto by screws. In the change insert 30 is provided a downwardly tapering shrink chuck reception opening 52, whose internal dimensions are so adapted to the external dimensions of the clamping section 39 that the latter can be introduced in accurately fitting manner into the reception opening 52. As a result of the large-area contact of the telescoping parts in the vicinity of the conical seat faces it is possible to achieve a good heat conduction between the actively cooled cooling outer part 45 and the clamping section 39 of the shrink chuck. If the shrink chucks are to be processed together with another clamping section, e.g. steep taper, it is merely necessary to replace the change insert 30 by another change insert, whose shrink chuck reception opening is correspondingly adapted to the outer contours of the steep taper.

The cooling device is also used for the active water cooling of the cooling adaptors provided for cooling the tool reception sections of shrink chucks (FIG. 3). A cooling adaptor has a substantially sleeve-like cooling outer part 55, in whose walls are provided coolant ducts, which are connected by means of the coolant lines 56, shown in broken line form in FIG. 1, in the form of flexible plastic hoses to the water supply 48. A downwardly conically widening reception opening 57 in the interior of the cooling outer part is used for receiving replaceable change inserts 28 introduceable from below into the cooling outer part and having a generally conical outer face, which can be pressed with intimate contact onto the inside of the reception opening 57. At the upper end of the change insert constructed in the form of a slotted frustum sleeve is provided a circumferential annular groove 58 into which, with the change insert inserted in the cooling outer part, is locked a locking member provided on said outer part 55 and which is operable by actuating a slider 59 on the outer circumference of the cooling outer part for releasing the change insert from the latter.

In the change insert 28 is formed a downwardly widening, conical reception opening 60, whose cone angle of approximately 4.5° essentially corresponds to the cone angle of the tool reception section of the shrink chuck, onto which can be mounted from above the cooling adaptor or change insert. As a result of the elongated slots between the latter are obtained on the change insert six springy tongues 61, which are firmly interconnected in the vicinity of the annular groove and have downwardly directed free ends, so that the reception opening 60 bounded or enclosed by the spring tongues is slightly elastically widenable.

On inserting a change insert 28 in the cooling outer part the locking device is locked and retains the change insert in the cooling outer part in a firm manner, but a slight clearance of motion is still possible. If the cooling adaptor is now mounted on a shrink chuck, the still slightly movable sleeve is inverted over the tool reception section until the insides of the tongues 61 rest in large area manner on the outer conical face of the tool reception section. On further lowering the cooling outer part relative to the change insert the tongues 61 are pressed in the manner of a chuck through the cooling outer part into a firm contact with the shrink chuck, so that the cooling adaptor is firmly mounted on said shrink chuck and there is a good heat conduction between the tool reception section and the actively cooled cooling outer part 45 through the change sleeve 28 made from a good heat conducting metal, e.g. aluminum. After cooling has taken place the cooling adaptor is raised from the shrink chuck and initially the cooling outer part is raised slightly upwards from the change insert and consequently the external pressure is removed from the spring tongues 61, so that the reception opening 60 can widen and a problem-free raising of the cooling adaptor from the shrink chuck is possible. Without this appropriate widening of the reception opening 60, in the case of pointed conical tool reception sections, as a result of self-restraint, a cooling adaptor fitted with intimate contact could not be removed or could only be removed with the aid of higher tensile forces from the shrink chuck.

With the aid of FIGS. 4 and 5 the induction coil unit 17 will now be described in greater detail. With respect thereto in a casing 65 made from electrically non-conducting material is placed a heating part, which is designed for heating a single shrink chuck with a maximum external diameter of approximately 53 mm. It essentially comprises the induction coil or inductor 18 and a resonant circuit capacitor, which are connected by means of lines guided by the cable tow 26 to the high frequency generator housed in the lower cabinet or to the water supply and together form a parallel resonant circuit. The inductor comprises a water-cooled, copper tube coil 17 coated with transformer paint for electrical insulation purposes, which has an internal diameter of approximately 65 mm and an axial coil length of approximately 50 mm. The inductor is screwed with the water-cooled resonant circuit capacitor so as to form a unit provided with a cooling water forward and return means.

The coil 18 is housed in a downwardly open inner area of the casing 65, which is upwardly closed by means of a removable cover plate 66, which coaxially with the central coil axis 19 has an upwardly conically widening tool passage opening 67. Below the upper casing cover 66 a flat slider 68 projects into the area above the induction coil 18. The slider displaceable vertically to the coil axis is made from an electrically non-conducting material and in the vicinity of the coil axis 19 has a stepped cylindrical reception opening 69 in which can be inserted replaceable disks 70. An insertion disk 70 has a cylindrical tube portion 71 with an internal diameter slightly larger than the external diameter of the largest tool to be clamped in or out, as well as an outwardly projecting collar section 72 with which the disk rests in the stepped cylindrical reception opening 69 in such a way that the top of the disk engages on the underside of the upper cover 66.

The flat slider 68 and the replaceable disk 70 carried by it are essential elements of an automatic positioning device ensuring in a fully mechanical manner that independently of the shrink chuck diameter a clamping section of the shrink chuck on lowering the induction unit in the direction of the work position is in an optimum axial position with respect to the induction coil and in the optimum working position a mouth-close portion of the tool reception section is level with the axial coil center or the mouth front end 73 of the shrink chuck is slightly above the coil center. This is ensured by a mechanical stop of the mouth front end of a shrink chuck on the disk 70 serving as a stop disk. By means of the slider 68 the latter is brought into a central position in the case of large diameter tools (FIG. 4), so that the front end of the shrink chuck surrounding the tool reception opening strikes in annular manner against the underside of the cylindrical portion 71 of the stop disk 70. However, if the shrink chuck diameter in the vicinity of the mouth front end 73 is smaller than the internal diameter of the stop disk 70, if the latter was in a central position the shrink chuck would partly penetrate from below into the stop disk and consequently with respect to the induction coil would be higher than in the optimum working position. Thus, in the case of smaller diameter shrink chucks the stop disk 70 is displaced by means of the slider 68 into the eccentric position shown in FIG. 5, so that only a partial ring portion of the disk 70 serves as an axial stop for the shrink chuck.

The stop disk 70 is appropriately made from an electrically non-conducting, heat-resistant and impact-damping material, e.g. from an asbestos-free friction material bound by rubber and special resin and without any admixing of metal, such as is also usable for brake and clutch linings. As a result of the metal-free material the field strength distribution of the electromagnetic alternating field produced by the coil is not influenced.

In cases where an influencing of the induction field strength distribution is desired, e.g. when shrinking HSS or steel tools with a shank diameter of less than 16 mm, in place of the non-conducting disk 70 it is also possible to use an element made from an induction field-influencing, electrically conductive and/or magnetizable material, e.g. ferrite, which takes over the function of a field concentrator in order to concentrate the inductively introduced heating power on the tool reception section of the shrink chuck.

The water-cooled high frequency generator housed in the lower cabinet 2 and designed for a fixed rated power of 8 kw at operating frequencies up to a maximum of approximately 60 kHz has on the input side a mains filter and operates in the power part with a converter and a connected inverter, both of which are water-cooled. The passage of cooling water is monitored by means of a flow funnel and the temperature of the parts with a temperature monitor. Between the power part and the generator output is provided a ferrite core transmitter air-cooled by a fan. The electronic generator control connected to the control panel elements comprises a microprocessor performing all the control functions of the shrinking apparatus. Control takes place by means of the control keys or buttons of the control panel 4 and the functions set therewith are displayed on the display. In the control unit are stored various preset program sequences, which comprise the optimum equipment settings for shrinking in or out for different tool and chuck diameters. A reheating function which can be initiated e.g. by twice briefly depressing a button can be used, if need be, to reheat again for a fixed programmed in time of e.g. 2 to 4 seconds, so as to e.g. further widen a chuck for removing a tool.

The generator control permits an automatic identification of the type of a shrink chuck entering the action area of the induction coil and dependent thereon an automatic adaptation of the generator operation so that there is an optimum coupling in of the inductive heating energy into the shrink chuck. For this purpose the generator electronics can operate with several, e.g. two or three different, fixed preset output voltages. This makes it possible to work with a single induction coil for all the chuck diameters or tool diameters occurring in the diameter range in question. Thus, there is no need for inductor replacement. The electronics recognize as a response to a corresponding coupling between inductor and shrink chuck whether a chuck diameter is below a preset diameter in the inductor and optionally brings about a fully automatic switching to a higher output voltage with which the power can be raised again to the rated power level. This automatic adaptation makes the shrinking in and out of smaller chuck diameters much faster and is particularly advantageous for the shrinking out of smaller diameter steel tools.

With the aid of the explained multi-station shrinking apparatus it is possible in permanent operation to clamp in and out large numbers of tools and typically for each shrinkage process there are cycle times between approximately 30 and 60 seconds. The following procedure can be adopted. Firstly a shrink chuck, e.g. chuck 8, can be inserted from above in the shrink chuck receptacle 10 having a correspondingly adapted change insert 30 of a work station 5. Before or afterwards the coil-carrying column 16 is so pivoted and locked with the aid of the control lever 22 that the induction coil in the upper neutral position is positioned above the shrink chuck. Subsequently by means of corresponding keys or buttons of the control panel 4 the material type of the tool to be clamped in (e.g. high speed steel ("HSS") or carbide) and the associated tool diameter or diameter range (e.g. smaller or larger than a diameter limit value) can be inputted. As a function of this input the slider 68 of the positioning device is automatically set in such a way that the stop disk 70 is positioned either centrally with respect to the coil axis (with large diameters, FIG. 4) or eccentrically to the coil axis (with small tool or shrink chuck diameters, FIG. 5).

After depressing a starting button the induction coil 17, driven by means of the electric motor 23, is lowered onto the shrink chuck to be heated until the stop disk 70 rests on the mouth front end 73 of the shrink chuck, so that the lowering drive is automatically switched off. Heating operation then starts automatically, in which the induction coil is initially supplied with power at the lowest of the preset voltage stages and fixed frequency. The power absorbed by the shrink chuck is monitored by means of the generator current. If the tapped power is below a threshold, then automatically switching takes place to the next higher voltage until an output voltage ensuring optimum power reduction is ensured. Thus, typically after 3 to 6 seconds the heating process has advanced to such an extent that through the tool passage opening 67 and stop ring 70 a tool can be introduced into the thermally widened tool reception opening of the shrink chuck. As soon as the tool is introduced, the heating process is automatically ended and the induction coil automatically returns to the upper neutral position.

Throughout the heating process the clamping standard taper firmly located in the water-cooled shrink chuck receptacle essentially remains at the shrink chuck receptacle temperature of typically 15 to 20° C. For a faster cooling of the conical tool reception section, the cooling adaptor 13 fitted to the end of flexible hose lines 56 and consequently freely movable to a limited extent is manually mounted on the shrink chuck. The slotted inner sleeve is pressed firmly onto the tool reception section by means of the cooling outer part movable with respect thereto for improving the heat transfer between the cooling adaptor and shrink chuck.

As the now complete tool is water-cooled in the first work station 5 to a temperature suitable for manual shrink chuck handling, in the second work station 6 beside it a corresponding shrinkage process can be initiated and performed. If for this purpose different dimensioned shrink chuck receptacles and/or cooling adaptors are needed, said parts by corresponding replacement of the change inserts could be adapted to the shape of the shrink chuck to be processed. As inductive heating of the shrink chuck received in the second work station can be carried out whilst the chuck received in the first work station is cooling, with said shrinkage apparatus shrinking cycles (heating, tool insertion or removal, cooling) can be performed in mutually overlapping manner and in no case does a still hot shrink chuck have to be moved by the operator. This leads to a very operator-friendly and ergonomically constructed shrinkage work place, whose parts do not heat even in permanent operation with a high tool throughput, because all parts coming into heat conducting contact with the shrink chucks are water-cooled. Thus, only one induction coil 18 is required for all the shrinkage diameters in the range e.g. between 6 mm and 25 to approximately 32 mm in diameter, the coil being brought to the next work station by pivoting the induction means, so that no hot shrink chuck movement is required.

A not pictorially shown shrinking apparatus with a simpler construction has no motor vertical displacement of the induction coil unit. Instead of this a forwardly projecting handle connected to the induction coil unit is provided and which carries a push button, which acts on a holding device with which the induction coil unit can be clamped at random heights of the vertical guide 25. On depressing the button the coil unit is released for vertical displacement and on releasing the button is maintained in the set height position. By a counterweight coupled to the induction coil unit by a reel-guided cable, an easy vertical displacement without significant force expenditure is possible. It is also possible in place of the three workstations shown, to have more than three or less than three, e.g. two or even one workstation. With simple apparatuses there may not even be a need for water cooling of the shrink chuck receptacle of a workstation. If rapid cooling times are unnecessary, it is optionally possible to do away with the complete cooling device associated with the workstations, including the cooling adaptors 13, 14, and 15.

It is also possible, in place of the described, integrated cooling device, to provide a separate cooling device, in which e.g. the water supply 48 optionally equipped with a cooling unit is housed in its own casing and to the water supply are connected by flexible hose lines or the like one or more cooling adaptors of the described type. Such a separate cooling device can be set up alongside a shrinking apparatus without cooling device, so that with the aid of the easily handlable, liquid-cooled cooling adaptors, the shrink chucks heated by the shrinking apparatus in inductive manner or in some other way, e.g. by hot air, can be rapidly and effectively cooled. The separate cooling device can be accompanied by water-cooled shrink chuck receptacles optionally fittable to a random shrinking apparatus and as described in exemplified manner here relative to FIGS. 1 and 2.

What is claimed is:

1. An apparatus for the thermal clamping and release of tools in shrink chucks, the apparatus comprising a shrink chuck comprising a tool reception section with at least one zonally thermally widenable tool reception opening for receiving a tool shank and a clamping section for receiving the shrink chuck in a machine spindle, the apparatus further comprising at least one heating device for heating at least part of the tool reception section and a cooling device for the active cooling of a heated part of the tool reception section, the apparatus further comprising:

a first work station and at least one second work station, wherein at least one of the first and second work stations is provided for the heating and the active cooling of shrink chucks received in the work station and wherein the work stations and the heating device are movable relative to one another for changing between work stations, and wherein the heating device is movable between the first and second work stations by pivoting the heating device about a vertical pivoting axis.

2. The apparatus according to claim 1, further comprising a chuck identification device for automatically identifying the type of shrink chuck to be heated.

3. The apparatus according to claim 1, further comprising a power control for the heating device, wherein the power control can be controlled as a function of a chuck identification signal of a chuck identification device, the chuck identification signal being characteristic of a particular shrink chuck.

4. The apparatus according to claim 1, wherein each work station is provided with a shrink chuck receptacle coolable by a cooling liquid.

5. The apparatus according to claim 1, wherein the cooling device includes a cooling unit for actively cooling a cooling liquid if desired.

6. The apparatus according to claim 1, wherein the cooling device includes a closed circuit for a cooling liquid.

7. The apparatus according to claim 1, wherein the cooling device is constructed as a separate cooling device removable from and associated with a shrinking device.

8. The apparatus according to claim 1, wherein there are provided at least three workstations.

9. The apparatus of claim 8 wherein all of the workstations are provided for the heating and the active cooling of the shrink chucks.

10. The apparatus according to claim 1, wherein the cooling device includes at least one shrink chuck receptacle coolable by a cooling liquid and having a shrink chuck reception opening for receiving a shrink chuck in a positionally secure manner.

11. The apparatus according to claim 10, wherein the at least one shrink chuck receptacle has associated therewith several replaceable change inserts with differently dimensioned reception openings for adapting the at least one shrink chuck receptacle to shrink chucks having differently shaped clamping sections.

12. The apparatus according to claim 1, wherein the cooling device includes at least one cooling adaptor which can be brought into heat conducting contact with the shrink chuck for dissipating heat from the tool reception section, wherein the cooling device is constructed for cooling the cooling adaptor with a cooling liquid.

13. The apparatus according to claim 12, wherein the cooling adaptor is connectable to a flexible line for supplying and removal of cooling liquid to and from the cooling adaptor.

14. The apparatus according to claim 12, wherein a cooling adaptor comprises a reception opening which is adapted to an outer contour of the tool reception section in such a way that a cooling adaptor can be applied with a large-area contact to the tool reception section.

15. The apparatus according to claim 14, wherein the reception opening has a conical shape characterized by an opening angle between approximately 3° and approximately 6°.

16. The apparatus according to claim 14, wherein the reception opening is widenable for loosening the contact between the shrink chuck and the cooling adaptor.

17. The apparatus according to claim 1, wherein the heating device is constructed as an induction device with at least one induction coil for the inductive heating of the tool reception section.

18. The apparatus according to claim 17, wherein the heating device has only one induction coil constructed in such a way that tools of different diameters at least in a range of approximately 6 mm to approximately 25 mm can be shrunk.

19. The apparatus according to claim 17, wherein the heating device comprises a liquid-cooled induction coil formed by a tube through which flows a cooling liquid.

20. The apparatus according to claim 17, wherein a generator is provided for applying heating power to an induction coil and wherein a control device of the generator is constructed to provide progressively increased output voltage in response to a chuck identification signal and wherein as the chuck identification signal use is made of a signal characterizing the heating current drawn from the inductor coil to heat the shrink chuck.

21. The apparatus according to claim 17, further comprising a field concentrator for controlled concentration of an alternating electromagnetic field produced by an induction coil on one area of the shrink chuck.

22. The apparatus according to claim 21, wherein the field concentrator is replaceable and insertable into the heating device as a function of the shrink chuck type to be heated.

23. An apparatus for the thermal clamping and release of tools in shrink chucks, the apparatus comprising a shrink chuck comprising a tool reception section with at least one zonally thermally widenable tool reception opening for receiving a tool shank and a clamping section for receiving the shrink chuck in a machine spindle, the apparatus further comprising at least one heating device for heating at least part of the tool reception section and a cooling device for the active cooling of a heated part of the tool reception section, the apparatus further comprising:
- a first work station and
- at least one second work station,
- wherein at least one of the first and second work stations is provided for the heating and the active cooling of shrink chucks received in the work station and
- wherein the work stations and the heating device are moveable relative to one another for changing between work stations and further comprising an automatic positioning device for automatically positioning the heating device correctly relative to differently dimensioned shrink chucks.

24. An apparatus for the thermal clamping and release of tools in shrink chucks, the apparatus comprising a shrink chuck comprising a tool reception section with at least one zonally thermally widenable tool reception opening for receiving a tool shank and a clamping section for receiving the shrink chuck in a machine spindle, the apparatus further comprising at least one heating device for heating at least part of the tool reception section and a cooling device for the active cooling of a heated part of the tool reception section, the apparatus further comprising:
- a first work station and
- at least one second work station,
- wherein at least one of the first and second work stations is provided for the heating and the active cooling of shrink chucks received in the work station and wherein the work stations and the heating device are moveable relative to one another for changing between work stations,
- an automatic positioning device for automatically positioning the heating device correctly relative to differently dimensioned shrink chucks,
- wherein the automatic positioning device includes at least one mechanical stop element associated with the heating device and being position adjustable as a function of the shrink chuck dimensions for limiting a movement of the heating device into a work position.

25. An apparatus for the thermal clamping and release of tools in shrink chucks, the apparatus comprising a shrink chuck comprising a tool reception section with at least one zonally thermally widenable tool reception opening for receiving a tool shank and a clamping section for receiving the shrink chuck in a machine spindle, the apparatus further comprising at least one heating device for heating at least part of the tool reception section and a cooling device for the active cooling of a heated part of the tool reception section, the apparatus further comprising:
- a first work station and
- at least one second work station,
- wherein at least one of the first and second work stations is provided for the heating and the active cooling of shrink chucks received in the work station and wherein the work stations and the heating device are moveable relative to one another for changing between work stations,
- an automatic positioning device for automatically positioning the heating device correctly relative to differently dimensioned shrink chucks,
- wherein the automatic positioning device includes a slider being movable transversely to a movement direction of the heating device, the movement direction running between a neutral position and a work position of the heating device.

26. The apparatus according to claim 25, wherein the slider is constructed for carrying replaceable stop elements.

27. An apparatus for the thermal clamping and release of tools in shrink chucks, the apparatus comprising a shrink chunk comprising a tool reception section with at least one zonally thermally widenable tool reception opening for receiving a tool shank and a clamping section for receiving the shrink chuck in a machine spindle, the apparatus further comprising at least one heating device for heating at least part of the tool reception section and a cooling device for the active cooling of a heated part of the tool reception section, the apparatus further comprising:
- a first work station and
- at least one second work station;
- wherein at least one of the first and second work stations is provided for the heating and the active cooling of shrink chucks received in the work station and wherein the work stations and the heating device are moveable relative to one another for changing between work stations
- an automatic positioning device for automatically positioning the heating device correctly relative to differently dimensioned shrink chucks,
- wherein the automatic positioning device is controllable as a function of at least one inputable parameter characterizing one of the shrink chuck and the tool.

28. An apparatus for the thermal clamping and release of tools in shrink chucks, the apparatus comprising a shrink chuck comprising a tool reception section with at least one zonally thermally widenable tool reception opening for receiving a tool shank and a clamping section for receiving the shrink chuck in a machine spindle, the apparatus further comprising at least one heating device constructed as an induction device with at least one induction coil for the inductive heating of at least part of the tool reception section, a field concentrator for controlled concentration of an alternating electromagnetic field produced by an induction coil on one area of the shrink chuck, and a cooling device for the active cooling of a heated part of the tool reception section, the apparatus further comprising:
- a first work station and
- at least one second work station,
- wherein at least one of the first and second work stations is provided for the heating and the active cooling of shrink chucks received in the work station and wherein the work stations and the heating device are moveable relative to one another for changing between work stations,
- an automatic positioning device for automatically positioning the heating device correctly relative to differently dimensioned shrink chucks,
- wherein the field concentrator is replaceable and insertable into the heating device as a function of the shrink chuck type to be heated, and the field concentrator comprises at least one replaceable element made from magnetizable material, the element being shaped in a manner to serve as a mechanical stop element for the automatic positioning device.

29. An apparatus for the thermal clamping and release of tools in shrink chucks, the apparatus comprising a shrink chuck comprising a tool reception section with at least one zonally thermally widenable tool reception opening for receiving a tool shank and a clamping section for receiving the shrink chuck in a machine spindle, the apparatus further comprising at least one heating device for heating at least part of the tool reception section and a cooling device for the active cooling of a heated part of the tool reception section, wherein the cooling device includes at least one cooling adaptor which can be brought into heat conducting contact with the shrink chuck for dissipating heat from the tool reception section, wherein the cooling device is constructed for cooling the cooling adaptor with a cooling liquid, and wherein the cooling adaptor comprises a reception opening which is adapted to an outer contour of the tool reception section in such a way that the cooling adaptor can be applied with a large-area contact to the tool reception section, the reception opening being widenable for loosening the contact between the shrink chuck and the cooling adaptor, wherein the cooling adaptor comprises several spring elements arranged around the circumference of the reception opening with a circumferential spacing, the spring elements bounding the reception opening, the apparatus further comprising:

a first work station and at least one second work station, wherein at least one of the first and second work stations is provided for the heating and the active cooling of shrink chucks received in the work station and wherein the work stations and the heating device are moveable relative to one another for changing between work stations.

30. An apparatus for the thermal clamping and release of tools in shrink chucks, the apparatus comprising a shrink chuck comprising a tool reception section with at least one zonally thermally widenable tool reception opening for receiving a tool shank and a clamping section for receiving the shrink chuck in a machine spindle, the apparatus further comprising at least one heating device for heating at least part of the tool reception section and a cooling device for the active cooling of a heated part of the tool reception section, wherein the cooling device includes at least one cooling adaptor which can be brought into heat conducting contact with the shrink chuck for dissipating heat from the tool reception section, wherein the cooling device is constructed for cooling the cooling adaptor with a cooling liquid, wherein the cooling adaptor has associated with it several replaceable change inserts with differently dimensioned reception openings, the change inserts being constructed to be fixed in tool-free manner to a coolable part of the cooling adaptor, the apparatus further comprising:

a first work station and at least one second work station, wherein at least one of the first and second work stations is provided for the heating and the active cooling of shrink chucks received in the work station and wherein the work stations and the heating device are moveable relative to one another for changing between work stations 31. An apparatus for the thermal clamping and release of tools in shrink chucks, the apparatus comprising a shrink chuck comprising a tool reception section with at least one zonally thermally widenable tool reception opening for receiving a tool shank and a clamping section for receiving the shrink chuck in a machine spindle, the apparatus comprising at least one heating device for heating at least part of the tool reception section and a cooling device for the active cooling of a heated part of the tool reception section, wherein the cooling device includes at least one cooling adaptor which can be brought into heat conducting contact with the shrink chuck for dissipating heat from the tool reception section, wherein the cooling device is constructed for cooling the cooling adaptor with a cooling liquid wherein the cooling adaptor comprises an insert provided with a widenable reception opening, the insert being movable to a limited extent with respect to a coolable cooling adapter body between a contact position and a release position, wherein in the contact position the insert is pressed with a large area contact onto the shrink chuck and in the release position the shrink chuck can be released from the cooling adaptor accompanied by widening of the reception opening, the apparatus further comprising:

a first work station and at least one second work station, wherein at least one of the first and second work stations is provided for the heating and the active cooling of shrink chucks received in the work station and wherein the work stations and the heating device are moveable relative to one another for changing between work stations.

32. An apparatus for the thermal clamping and release of tools in shrink chucks, the apparatus comprising a shrink chuck comprising a tool reception section with at least one zonally thermally widenable tool reception opening for receiving a tool shank and a clamping section for receiving the shrink chuck in a machine spindle, the apparatus further comprising at least one heating device for heating at least part of the tool reception section and a cooling device for the active cooling of a heated part of the tool reception section, the apparatus further comprising:

a first work station and at least one second work station, wherein at least one of the first and second work stations is provided for the heating and the active cooling of shrink chucks received in the work station and wherein the work stations and the heating device are movable relative to one another for changing between work stations, and wherein the cooling device includes at least one cooling adaptor which can be brought into heat conducting contact with the shrink chuck for dissipating heat from the tool reception section, wherein the cooling device is constructed for cooling the cooling adaptor with a cooling liquid.

* * * * *